United States Patent
Walker

[15] 3,682,440
[45] Aug. 8, 1972

[54] METHOD AND APPARATUS FOR REINFORCING THREADED CONNECTIONS UNDER DYNAMIC LOAD

[72] Inventor: Alfred C. Walker, 2584 Severn Avenue, Ottawa 14, Ontario, Canada

[22] Filed: Oct. 3, 1969

[21] Appl. No.: 864,297

[52] U.S. Cl. .....................254/29 A, 85/1 T, 287/60
[51] Int. Cl. ..............................................B66f 13/00
[58] Field of Search.....287/60, 62, 189.36 F; 85/1 T, 85/51, 1 R; 254/29 A, 100

[56] References Cited

UNITED STATES PATENTS

| | | |
|---|---|---|
| 2,935,299 | 5/1960 | Jansen......................254/29 A |
| 2,358,606 | 9/1944 | Summers.......................85/51 |
| 1,374,615 | 4/1921 | Talty............................85/1 R |
| 3,314,701 | 4/1967 | Durham....................85/1 R X |
| 1,109,295 | 9/1914 | Lampert..................254/29 A |
| 3,285,568 | 11/1966 | Biach........................254/29 A |
| 3,237,507 | 3/1966 | Modrey....................85/1 R X |
| 3,130,628 | 4/1964 | Blinn............................85/1 T |
| 2,374,403 | 4/1945 | Yarnall....................85/1 R X |

*Primary Examiner*—Andrew V. Kundrat
*Attorney*—Peter Kirby and Charles P. Curphey

[57] ABSTRACT

An arrangement for reinforcing a thread connected shaft under dynamic load in which a threaded coupling is fitted over the shaft and the coupling components are turned with respect to each other to lengthen the coupling and press against abutments at the ends of the portions of the shaft to be reinforced. In this way there is applied to the portion of the shaft being reinforced a tensile load at least as great as the maximum external load to be applied to the shaft.

1 Claim, 6 Drawing Figures

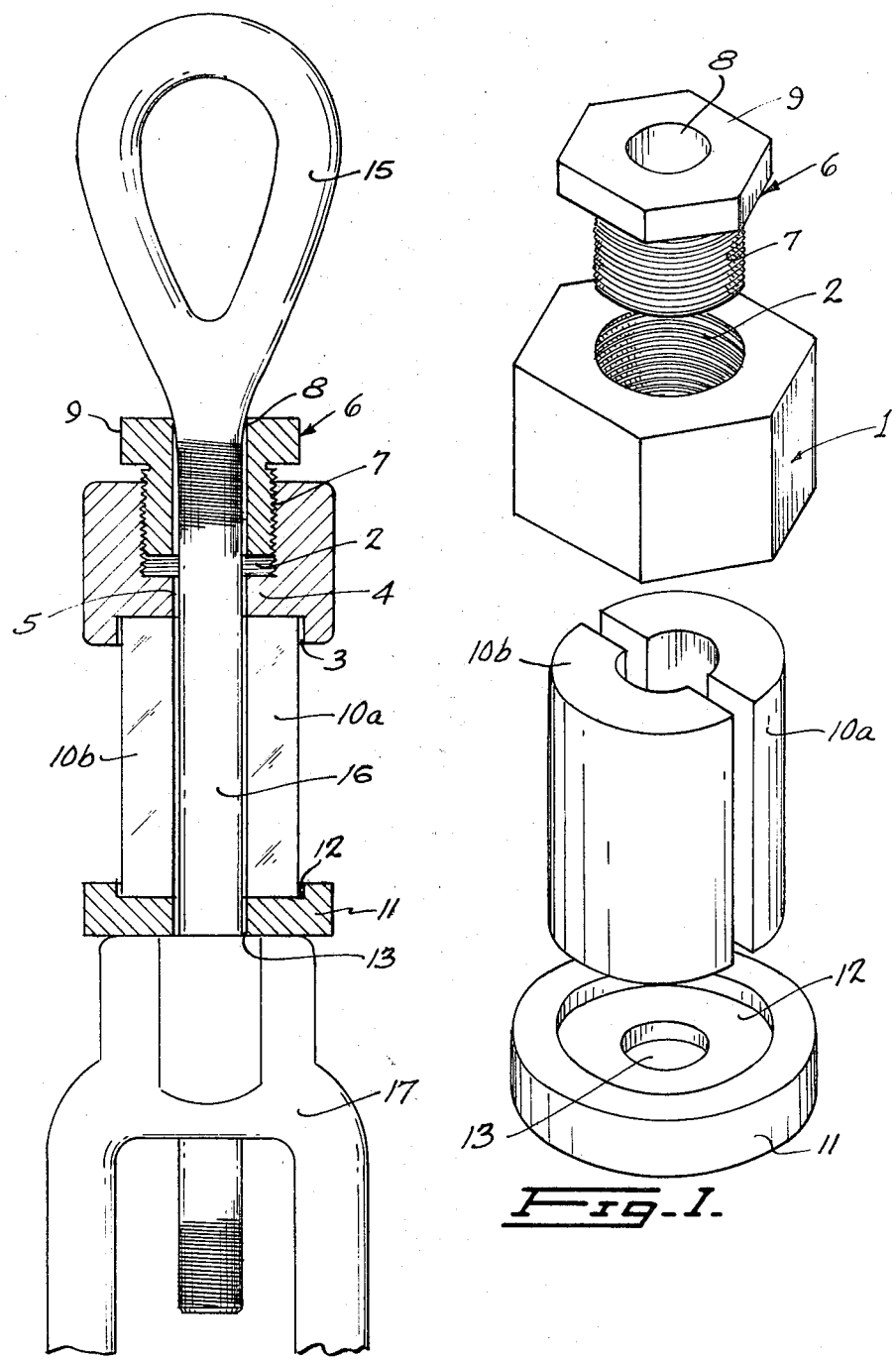

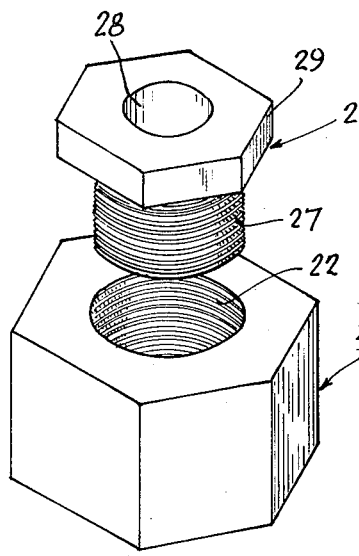
Fig. 3.
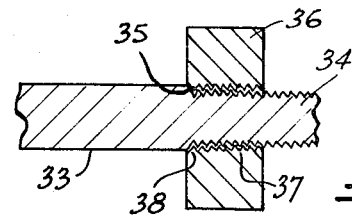
Fig. 4.
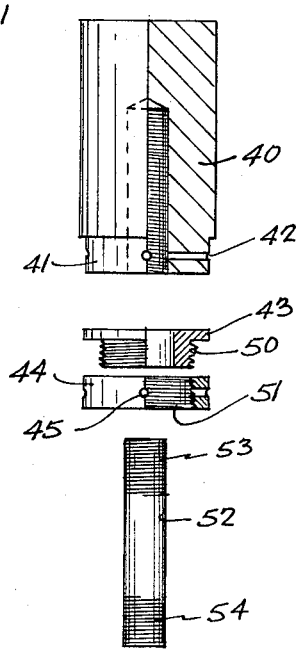
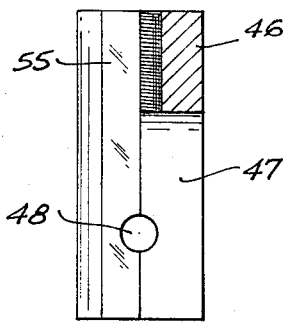
Fig. 5.
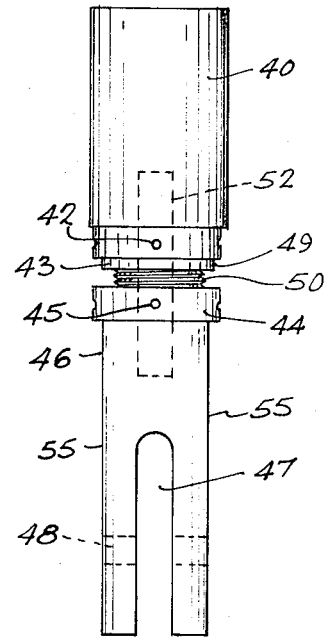
Fig. 6.

3,682,440

METHOD AND APPARATUS FOR REINFORCING THREADED CONNECTIONS UNDER DYNAMIC LOAD

BACKGROUND OF THE INVENTION

1. Field of the Invention

This invention relates to a method and apparatus for reinforcing threaded connections under dynamic load.

2. Description of Prior Art

The poor fatigue strength of threaded connections under dynamic load is well known. For instance, turnbuckles used to tension guy wires of hydroelectric transmission line towers are under a constant cyclic load due to the action of wind on the towers. These turnbuckles have a tendency to fail and most commonly fail in the threaded portions.

Another example of a threaded connection under dynamic load is a strain gauge load cell. Here again the threaded connector in the shaft connected to the test piece tends to fail during a prolonged test period.

In addition, there are many other examples of shafts, pipes, etc. which are under dynamic load and are screw connected.

These problems can, of course, be avoided by using larger threaded members but there still remains a need for a simple and inexpensive means of reinforcing existing threaded connections under dynamic load.

SUMMARY OF THE INVENTION

According to this invention a threaded connection under dynamic load is preloaded in such a manner that the thread does not experience a cyclic load until such time as the external load exceeds the preload. The preloading is accomplished by means of a threaded coupling which fits over the threaded member to be reinforced. By turning the coupling components with respect to each other, the coupling lengthens and presses against shoulders at the ends of the member being reinforced, thus applying a tensile load to the threaded member.

DESCRIPTION OF THE PREFERRED EMBODIMENTS

According to one preferred embodiment, the preload device comprises a nut-like member having an axial bore with internal thread extending partway through the member from one end, an axial recess extending in a short distance from the opposite end of the member and a web between the bore and recess having a smaller axial hole extending therethrough. An externally threaded plug with an axial bore is received in the internally threaded bore of the nut-like member. The nut-like member has a polygonal outer surface and the plug has a polygonal cap, permitting them to be turned with respect to each other by means of wrenches.

To allow for varying lengths of threaded portions to be preloaded, sleeves of varying lengths can be provided. These sleeves are preferably split so that they can be removed or inserted without dismantling the entire device and are held in place by the axial recess in the nut-like member at one end and a collar with an axial recess fitted over the other end.

In operation, the collar, nut-like member and plug are all fitted on the threaded member to be preloaded, the threaded member is adjusted to operational position, the collar is abutted against a shoulder at one end of the member while the plug is abutted against a shoulder at the other end, a split sleeve of suitable length is fitted into the recesses and the plug and nut-like member are turned with respect to each other until the desired load has been applied to the threaded section.

In accordance with another preferred embodiment, the device comprises a simple, internally threaded nut, an externally threaded plug with an axial bore and a sleeve consisting of an elongated member with a longitudinal slot. With this arrangement, the nut and plug are fitted on the threaded member to be preloaded, the threaded member is adjusted to operational position and a slotted sleeve of suitable length is fitted over the exposed portion of the threaded member. With the plug and the remote end of the sleeve abutting against shoulders, the plug and nut are turned with respect to each other until the desired load has been applied to the threaded section.

DESCRIPTION OF DRAWINGS

In the drawings which illustrate the invention, FIG. 1 is an isometric view of the prestressing components according to one embodiment of the invention;

FIG. 2 is a partial sectional view of the prestressing components of FIG. 1 applied to a turnbuckle;

FIG. 3 is an isometric view of a second embodiment of the invention;

FIG. 4 is a sectional view showing a shoulder arrangement on a threaded member;

FIG. 5 is an exploded view in partial section of a portion of a strain gauge load cell including a prestressing member according to this invention; and FIG. 6 is an elevation of the assembled prestressing member of FIG. 5.

The particular embodiment shown in FIGS. 1 and 2 includes a nut-like member 1 having an internally threaded axial bore 2 extending from one end and an axial recess 3 extending in a short distance from the other end. A web 4 remains between the axial bore 2 and the axial recess 3 and this web 4 includes a smaller axial hole 5 extending therethrough.

A plug 6 has an external thread 7 which mates with the internal thread bore 2 of the nut-like member 1. This plug 6 also has an axial hole 8 and a polygonal head 9.

A split sleeve 10a,10b is provided to fit within recess 3 and a cylindrical collar 11 is also provided with an axial recess 12 and an axial hole 13 which fits over the opposite end of the split sleeve 10a,10b.

In FIG. 2 the preloading device is shown installed on a turnbuckle. The portion of the turnbuckle shown includes eye 15 with threaded shaft 16. This threaded shaft 16 fits into body portion 17 of the turnbuckle.

As can be seen from FIG. 2, before the turnbuckle is installed, collar 11, nut-like member 1 and plug 6 must be fitted on the threaded portion 16 of eye 15 and then the threaded portion is turned into the body member 17. After the turnbuckle has been adjusted to the desired operating condition, the plug 6 is turned into nut-like member 1 the maximum distance, a split sleeve 10a,10b of suitable length is fitted into the axial recesses. Then with the plug 6 abutting against eye portion 15 and collar 11 abutting body member 17 the nut-like member 1 and plug 6 are turned with respect to each other by means of wrenches until the desired tensile load on the threaded portion of the turnbuckle has been reached. This preload should be in excess of the maximum external load to be applied to the turnbuckle.

When used with turnbuckles the device of this invention has the added advantage of serving as a lock for the turnbuckle assembly.

A somewhat simpler embodiment is shown in FIG. 3. In this arrangement a polgonal nut 21 is provided with a threaded axial bore 22. A plug 26 has an external thread 27 which mates with the thread of bore 22 and the plug is further provided with a polygonal head 29 and an axial hole 28. A sleeve 30 is also provided with a longitudinal groove 31.

In using this according to the invention, the nut 21 and plug 26 are fitted on the threaded member to be reinforced. With the plug turned into the nut, the plug is placed against a shoulder at one end of the member to be reinforced and the sleeve is placed over the threaded member with the end remote from the nut abutting a shoulder at the other end of the member. Then the nut is turned with respect to the plug until the desired tensile load has been applied to the member.

FIG. 4 shows an arrangement for providing a shoulder at the end of a threaded portion of a shaft. Thus, a shaft 33 has a thread 34 and at the juncture of the threaded portion and the remainder of the shaft is a small natural shoulder 35. A member 36 has an internal thread 37 which loosely mates with the shaft thread 34 and the nut further has at its lead edge a curved face 38 which abuts the shoulder 35.

Then, when one of the above pre-loading devices presses against member 36, the recess 38 presses against the shoulder 35 with the load being distributed out to the main part of the shaft 33. This arrangement fully protects the threaded portion including the junction point at the start of the thread.

In FIGS. 5 and 6 a portion of a strain gauge load cell 40 has an extending inner part 41 with a threaded axial bore.

A test piece holder 46 has a slot 47 and a pivot pin 48 extending across the slot to hold the test piece. The holder 46 also has a threaded axial bore in its upper end and the holder 46 is connected to the load cell inner part 41 by means of stud 52. This stud has a pair of threaded sections 53 and 54 with one end being turned into the threaded axial bore of part 41 and the other end turned into the threaded axial bore of holder 46. The inner part 41 has a series of radial recesses 42 to receive a tightening tool while holder 46 has flat faces 55 to receive a standard wrench.

The thread pre-loading device consists of a collar 44 with an internal thread 51 and a plug 43 with an external thread 50 which mates with internal thread 51. The collar 44 has radial recesses 45 to receive a tightening tool while the plug 43 has a head with flat faces 49 to receive a wrench.

The arrangement is assembled by turning plug 43 full way into collar 44 and placing this over the stud 52. Both the test piece holder and load cell are turned onto the stud and adjusted to operating position. Then the pre-loading device is expanded by turning the plug 43 and collar 44 with respect to each other until the desired tensile load has been applied to the threads.

The invention is further illustrated by the following Examples.

EXAMPLE 1

In order to assess the potential improvement to be gained from the device of the invention, fatigue tests have been made on several commercial ⅜ in. diameter turnbuckles both with and without the insert. The results were as follows: (a) Standard turnbuckles, tested with the load cycling i.e. between 200 and 2000 lb.

| Specimen No. | Life, cycles |
| --- | --- |
| 1 | 288,000 |
| 2 | 203,000 |
| 5 | 313,000 |
| 7 | 928,000 |

In each case the specimen failed in the threaded portion.

(b) Standard turnbuckles with inserts, loads cycled between 200 and 2000 lb.

| Specimen No. | Life, cycles |
| --- | --- |
| 4 | No failure in 10,314,000 |
| 8 | No failure in 17,973,000 |
| 10 | No failure in 24,000,000 |

(c) Standard turnbuckles with inserts, loads cycled between 350 and 3,500 lb.

| Specimen No. | Life, cycles |
| --- | --- |
| 8 (retested) | 227,000 |

This specimen failed at the eye and not in the thread.

The rate safe working load of a ⅜ inch diameter turnbuckle is listed as 1,200 lb. and the foregoing test results show that if a standard turnbuckle is cycled between effectively zero and 1-⅔ of the rated load, the life is of the order 300,000 cycles. With the insert, no failures occurred at this load. Thus the safe working load has been increased by at least 66 percent and possibly more. This represents a substantial gain in strength or alternatively a very large reduction in probability of failure if the rated safe load is left unchanged.

I claim:

1. A device for reinforcing a thread connected shaft under dynamic load, said device comprising a nut member having an internally threaded axial bore, an externally threaded plug with an axial hole extending therethrough, said plug being screw connectable into the nut member, and a split sleeve in the form of two semi-cylindrical members adapted to fit over the shaft being protected and being positioned between the nut member and a collar and with the ends of said sleeve being held within annular recesses in the nut and collar.

* * * * *